United States Patent [19]

Wycech

[11] Patent Number: 5,575,526
[45] Date of Patent: Nov. 19, 1996

[54] COMPOSITE LAMINATE BEAM FOR RADIATOR SUPPORT

[75] Inventor: Joseph S. Wycech, Grosse Pointe Woods, Mich.

[73] Assignee: Novamax Technologies, Inc., Warren, Mich.

[21] Appl. No.: 245,798

[22] Filed: May 19, 1994

[51] Int. Cl.⁶ .................................................. B60K 11/04
[52] U.S. Cl. .................... 296/205; 52/731.2; 180/68.4; 296/188; 296/194; 428/35.9; 428/36.5; 428/36.91
[58] Field of Search ..................... 296/188, 189, 296/194, 39.3, 205, 203, 901; 180/68.4, 731.1; 52/731.2, 728, 727, 732.3, 732.1; 428/31, 304.1, 122, 358, 35.9, 36.5, 36.91

[56] References Cited

U.S. PATENT DOCUMENTS

| | | | |
|---|---|---|---|
| 3,123,170 | 3/1964 | Bryant | 180/68.4 |
| 3,493,257 | 2/1970 | Fitzgerald et al. | 296/901 |
| 4,238,540 | 12/1980 | Yates et al. | 428/36 |
| 4,751,249 | 6/1988 | Wycech | 521/54 |
| 4,836,516 | 6/1989 | Wycech | 267/279 |
| 4,853,270 | 8/1989 | Wycech | 428/68 |
| 4,861,097 | 8/1989 | Wycech | 296/188 |
| 4,901,500 | 2/1990 | Wycech | 52/793 |
| 4,908,930 | 3/1990 | Wycech | 29/527.2 |
| 4,922,596 | 5/1990 | Wycech | 29/897.2 |
| 4,923,902 | 5/1990 | Wycech | 521/54 |
| 4,978,562 | 12/1990 | Wycech | 428/35.8 |
| 4,995,545 | 2/1991 | Wycech | 228/119 |
| 5,124,186 | 6/1992 | Wycech | 428/35.8 |

*Primary Examiner*—David M. Mitchell
*Assistant Examiner*—Kia M. Robinson
*Attorney, Agent, or Firm*—Dykema Gossett PLLC

[57] ABSTRACT

A composite laminate beam for an automotive body construction has an outer structural portion an an inner tube portion separated by a thin layer of structural foam. The beam may take the form of a radiator support structure, a windshield pillar, a rocker assembly or a drive shaft or similar structures. A method of making the beam is also disclosed.

10 Claims, 4 Drawing Sheets

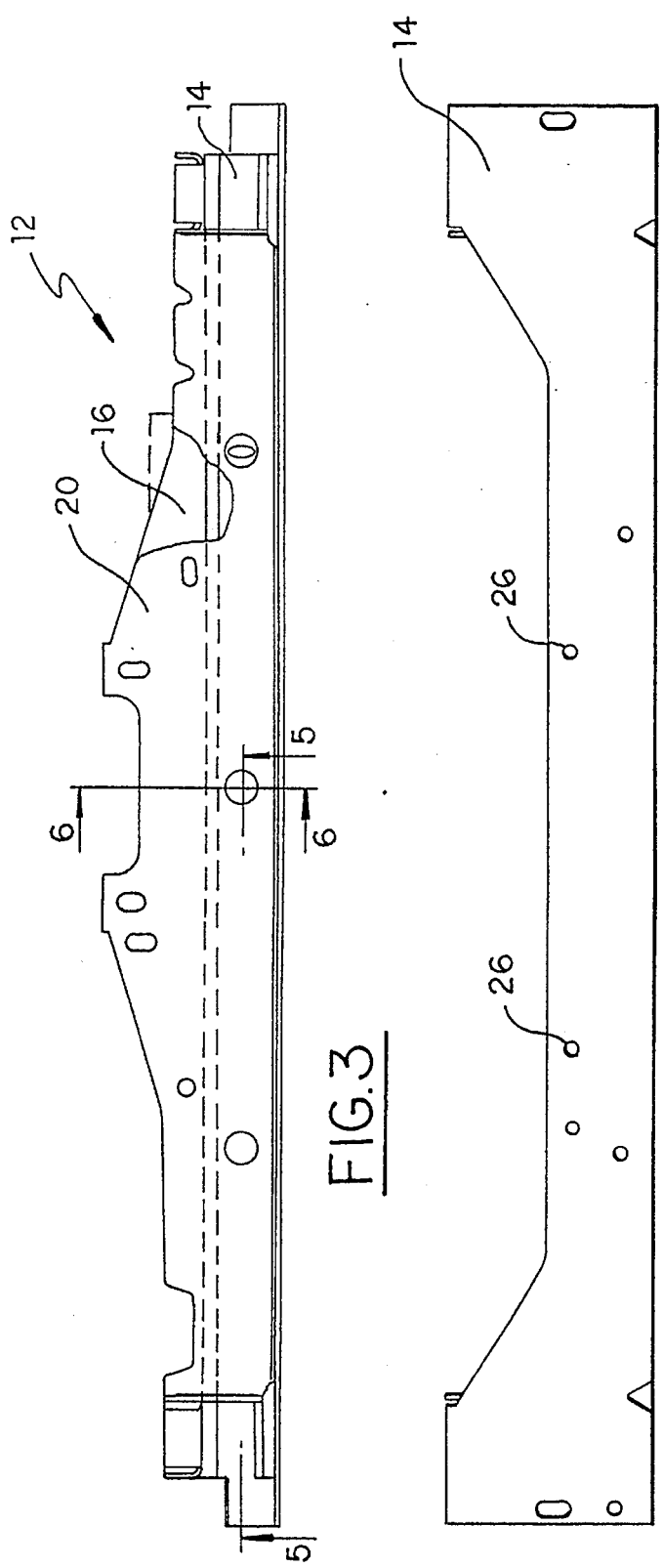
FIG.3
FIG.4
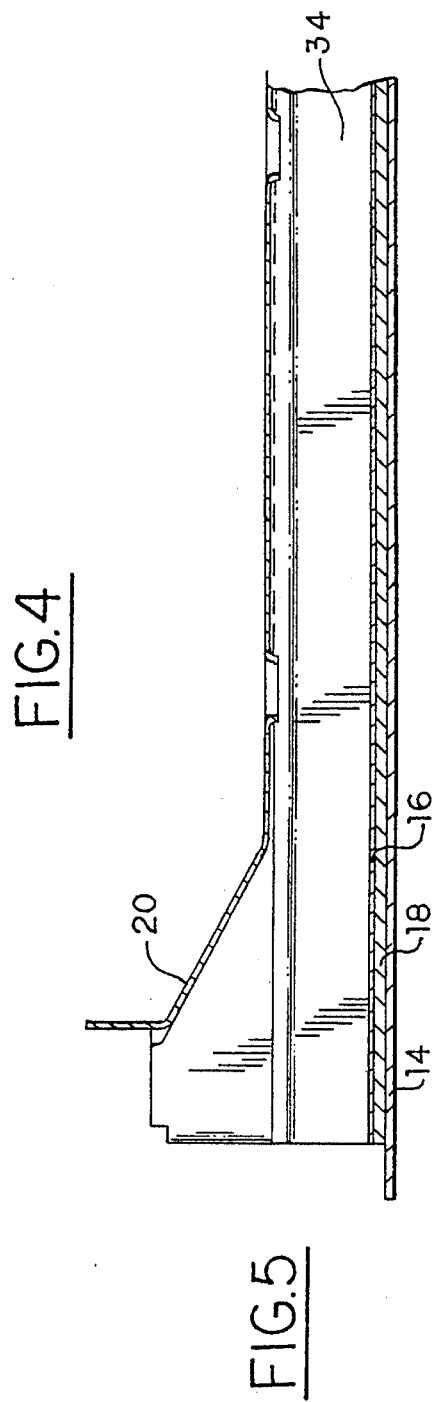
FIG.5

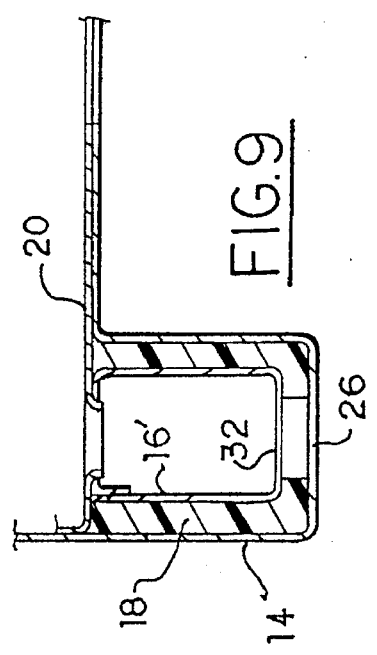
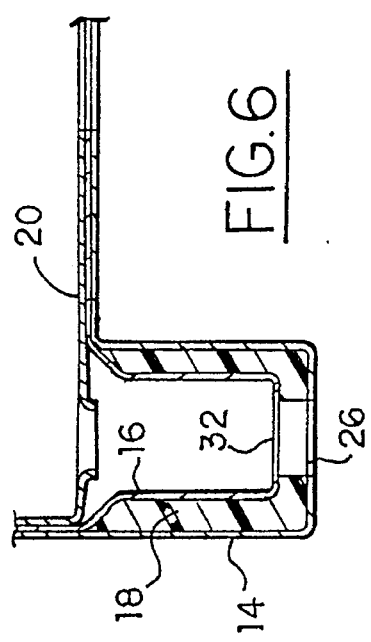
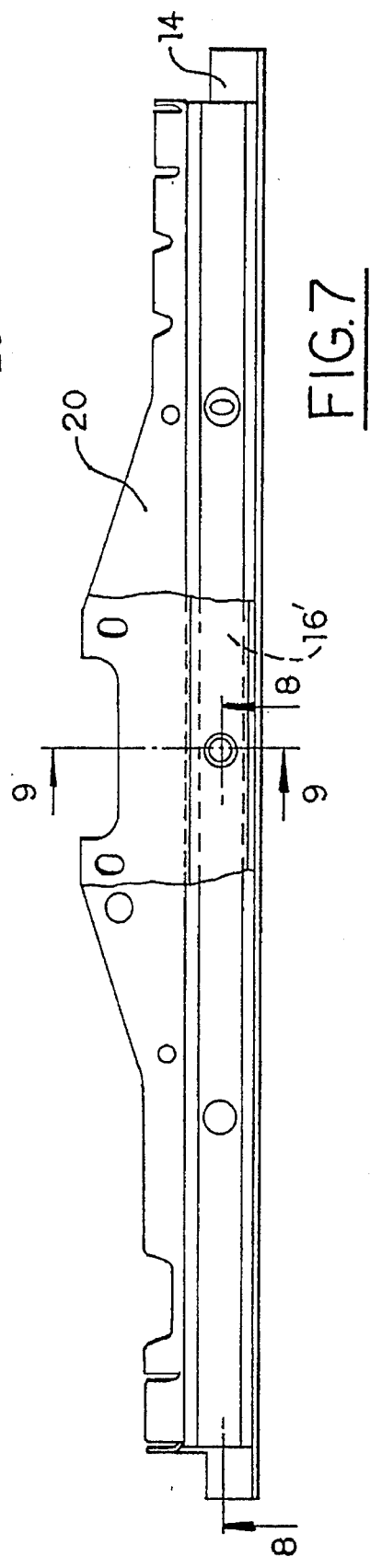
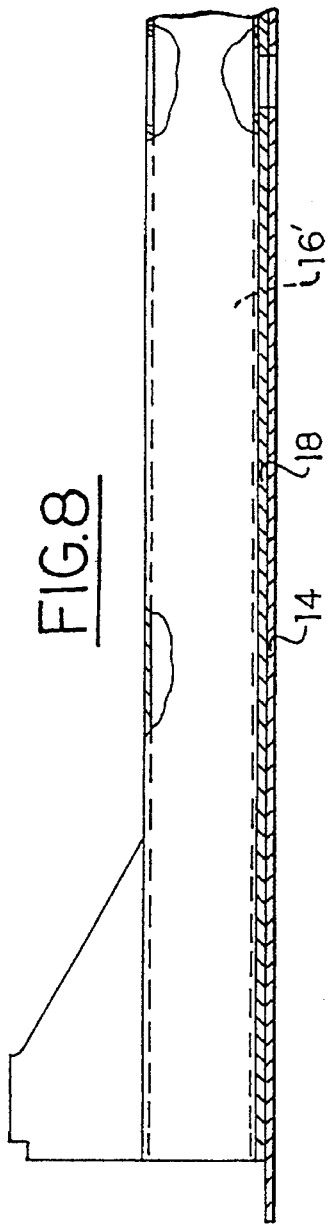

COMPOSITE LAMINATE BEAM FOR RADIATOR SUPPORT

TECHNICAL FIELD

The present invention relates generally to automotive body structural members and, more specifically, relates to techniques for increasing strength and stiffness of automotive body structural members.

BACKGROUND OF THE INVENTION

In a number of applications, particularly in the automotive industry, it is important to provide high-strength structural members at the lowest possible mass. A number of composite materials have been proposed by others in the past for use in forming structural members, including exotic light-weight alloys. In the automotive industry, however, the need for mass reduction without sacrificing strength must be balanced against the cost of the product to the consumer. Thus, there is a need for maintaining or increasing the strength of structural members such as rockers, windshield, pillars, radiator support beams and drive shafts without significantly increasing materials and labor costs.

The reinforcement of motor vehicle structural members through the use of composite materials is known. For example, the present inventor has disclosed a number of metal/plastic composite structures for use in reinforcing motor vehicles components. In U.S. Pat. No. 4,901,500, entitled "Lightweight Composite Beam," a reinforcing beam for a vehicle door is disclosed which comprises an open channel-shaped metal member having a longitudinal cavity which is filled with a thermoset or thermoplastic resin-based material. In U.S. Pat. No. 4,908,930 entitled, "Method of Making a Torsion Bar," a hollow torsion bar reinforced by a mixture of resin with filler is described. The tube is cut to length and charged with a resin-based material.

In U.S. Pat. No. 4,751,249, entitled, "Reinforcement Insert for a Structural Member with Method of Making and Using the Same," a precast reinforcement insert for structural members is provided which is formed of a plurality of pellets containing a thermoset resin with a blowing agent. The precast is expanded and cured in place in the structural member. In U.S. Pat. No. 4,978,562, entitled, "Composite Tubular Door Beam Reinforced with a Syntactic Foam Core Localized at the Mid Span of the Tube," a composite door beam is described which has a resin-based core that occupies not more than one-third of the bore of a metal tube.

In addition to the present inventor's own prior work, a number of metal laminates constructions are known in which flat metal plates are bonded together by an intervening layer of resin. It is also known to form a metal laminate sheet for use as a floor panel member which comprises a pair of flat metal sheets having an intervening layer of asphalt or elastic polymer.

Although filling sections with plastic foam does significantly increase section stiffness (at least when high-density foams are utilized), they also increase mass and thus part weight, which, as stated, is an undesirable feature in automotive applications. Moreover, although increasing the metal gauge of a section or adding localized metal reinforcements will increase stiffness, as the metal thickness increases, it is more difficult to form the part due to limitations in metal forming machines. Importantly, in many applications increasing metal gauge will not work effectively because stiffness frequency is proportional to section stiffness divided by section mass: $f \approx \sqrt{K/m}$ (i.e., frequency is proportional to the square foot of stiffness over mass). Mass and stiffness are increased proportionately, with no resultant change in the dynamic stiffness frequency of the part.

In addition, filling a section entirely with foam creates a large heat sink and requires elaborate sealing operations to close access holes in the stampings. Also, the presence of the foam may interfere with the placement of interior trim panels, wiring harnesses and hinges.

Accordingly, it would be desirable to provide a low-cost technique for increasing the stiffness of a section without proportionately increasing the mass. The present invention provides sections which have increased stiffness values with no significant increase in mass and without the use of high volumes of expensive resins. In many applications, the present invention reduces vibrations which cause unwanted "shake" of a component.

SUMMARY OF THE INVENTION

In one aspect, the present invention provides a hollow laminate beam characterized by its high-stiffness-to-mass ratio. The beam has an outer portion which is separated from an inner tube by a thin layer of structural foam. The cavity defined by the beam may be open or closed along its length.

In another aspect, the hollow laminate beam of the present invention is an automotive radiator support beam having an outer metal section and a generally rectangular inner tube, which may be open on one side. At least three sides of the rectangular inner tube are coated with a structural foam which is disposed between the rectangular inner tube and the outer metal section and in contact therewith. A metal cap is welded in place to complete the beam and retain the inner tube. The diameter of any through holes in the inner tube which are in alignment with through-holes in the outer portion are larger than the outer portion through-holes such that the structural foam does not block the through-hole clearances of either metal thicknesses.

In still another aspect, the laminate beam of the present invention is an automotive windshield pillar. A hollow metal tube is disposed within the pillar and is separated from the outer pillar stampings by a thin layer of structural foam.

In still another aspect, the laminate beam of the present invention is an automotive rocker panel assembly. The rocker panel assembly comprises mating inner and outer panel sections which form a generally rectangular rocker panel wall structure. Positioned within the rocker panel wall structure is a closely fitting inner metal tube which defines a cavity. A thin layer of structural foam is disposed between the rocker panel wall structure and the inner tube structure.

In still another aspect the beam is a motor vehicle drive shaft. An inner tube is closely received within the outer drive shaft housing, thereby defining an annulus. A layer of foam is disposed in the annulus.

The present invention also provides a method of increasing the stiffness-to-mass ratio of a beam, wherein the beam defines a cavity. The method includes the steps of forming a tube which fits within the cavity defined by the beam; placing a layer of resin on at least a portion of the outer surface of the tube; and inserting the tube in the cavity, with the resin contacts the inner wall of the tube.

In still another aspect, the present invention comprises a C-rail section for use in truck frames. An inner stamped or rolled C-shaped member is separated from the outer C-frame rail by a layer of resin-based material.

In still another aspect, a plurality of plugs made of a foam which disintegrates at high temperatures are used to close through-holes in a part which is subsequently filled with a core material. The part is then passed through an oven which melts or disintegrates the plugs.

BRIEF DESCRIPTION OF THE DRAWINGS

FIG. 3 is a plan view of the radiator support beam of FIG. 2.

FIG. 4 is a front elevational view of the radiator support beam of the radiator support beam of FIG. 2.

FIG. 5 is a fragmentary longitudinal cross-section along lines 5—5 of FIG. 3.

FIG. 6 is a cross-section along lines 6—6 of FIG. 3.

FIG. 7 is a plan view of another radiator support beam made in accordance with the present invention in another configuration.

FIG. 8 is a fragmentary longitudinal cross-section taken along lines 8—8 of FIG. 7.

FIG. 9 is a cross-section along lines 9—9 of FIG. 7.

DETAILED DESCRIPTION OF THE PREFERRED EMBODIMENTS

Figure 1:
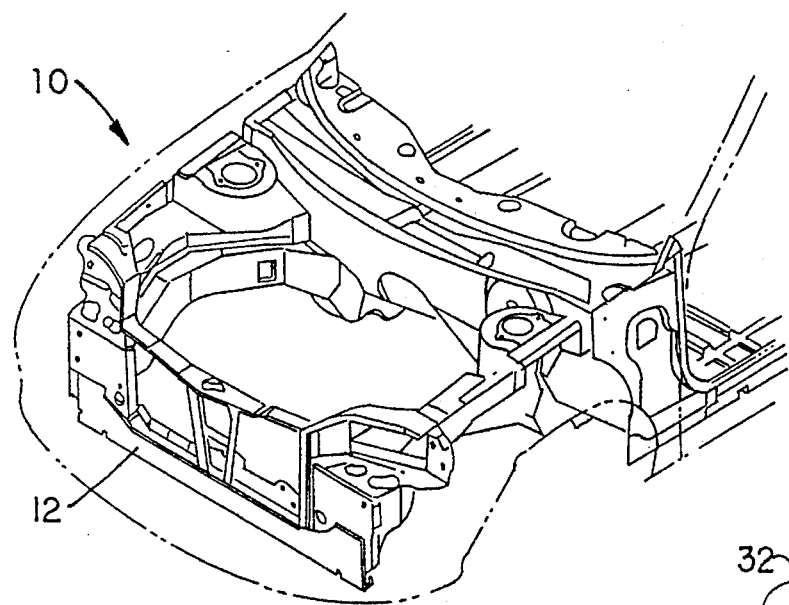
FIG. 1 is a perspective view of the front end of a motor vehicle, with the engine removed and the body shown in phantom.
Figure 2A:
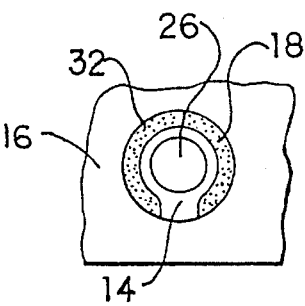
FIG. 2A is a fragmentary view of the oversized through-holes of the present invention.
Figure 2:
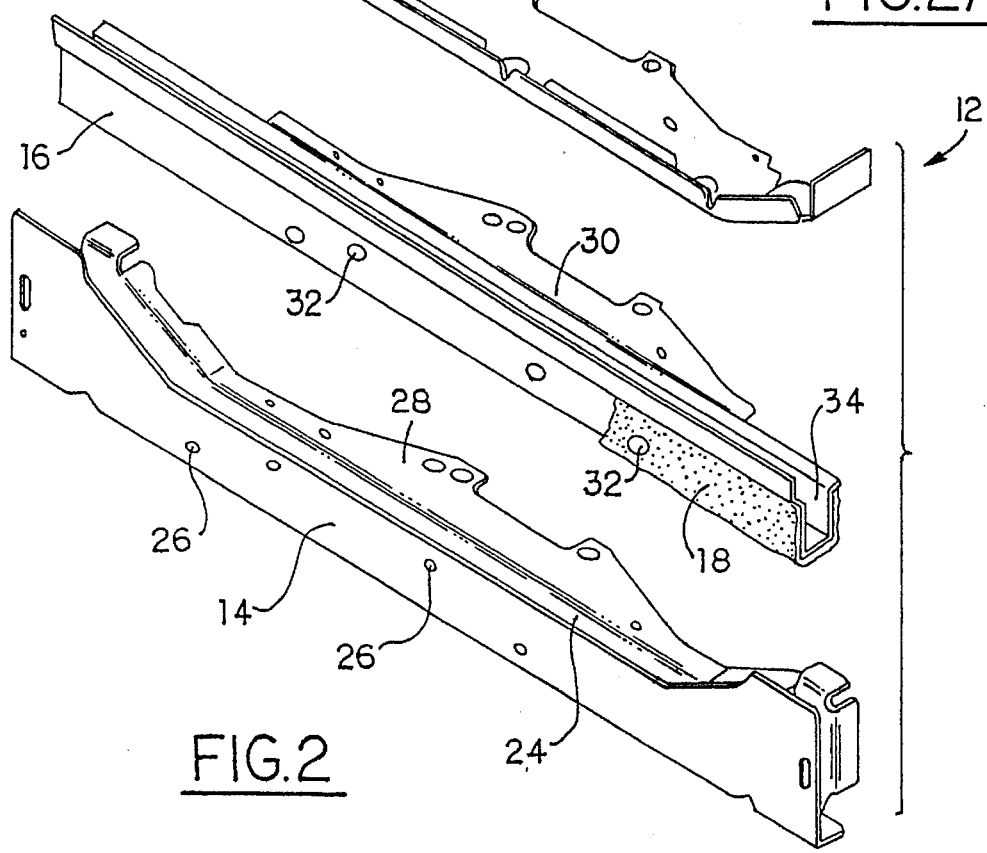
FIG. 2 is an exploded perspective view of a radiator support beam made in accordance with the present invention.

Referring now to FIG. 1 of the drawings, a motor vehicle 10 is shown with the engine removed and the body illustrated in phantom. Radiator support structure or beam 12 is mounted on the chassis and serves to support the vehicle radiator (not shown). In FIG. 2, radiator support beam 12 is illustrated in exploded view having outer shell or portion 14 which in this embodiment is a steel stamping. An inner tube, here shown as channel-shaped tube 16, is provided having a layer of resin-based material 18 applied to selected surfaces. Cap 20 is seen having a plurality of through-holes and serves to enclose channel-shaped tube 16 within outer shell 14.

More specifically, and referring now to FIGS. 2 through 6, outer shell 14 defines a cavity or channel 24. A number of through-holes 26 are seen through which electric wiring (not shown) may extend. Outer shell 14 includes a laterally extending mounting bracket or plate portion 28 which is secured to components of the engine assembly.

The benefits of the present invention are provided by inner tube or inner portion 16 which in this case is roll-formed metal, for example thin gauge steel, which is formed so that it may be closely fitted within cavity 24 of outer shell 14. Inner tube 16 in this embodiment closely conforms to the geometry of outer shell 14, including having a lateral plate 30 that mates with mounting bracket 28. By providing a layer of resin-based material 18 on selected surfaces of inner tube 16 and then assembling inner tube 16 and outer shell 14 to form the tube-in-tube construction shown best in the cross-section of FIG. 6, the stiffness of beam 12 is increased significantly without a significant increase in mass. Accordingly, as shown in FIGS. 2 and 6, a layer of a resin-based material 18 is applied, shown here on three sides of inner tube 18.

A number of resin-based compositions can be utilized to form resin-based layer 18 in the present inventions. The preferred compositions impart excellent strength and stiffness characteristics to beam 12 while adding only marginally to the weight. With specific reference now to the composition of the resin-based layer, the density of the material should preferably be from about 15 pounds per cubic feet to about 40 pounds per cubic feet to minimize weight. The melting point of resin-based layer 18, heat distortion temperature and the temperature at which chemical breakdown occurs must also be sufficiently high such that layer 18 substantially maintains its structure at high temperatures typically encountered in paint ovens and the like. Therefore, resin-based layer 18 should be able to withstand temperatures in excess of 300 degrees F. and preferably 350 degrees F. for short times. Also, the resin-based layer 18 should be able to withstand heats of about 180 degrees F. to 220 degrees F. for extended periods without exhibiting substantial heat-induced distortion or degradation.

In more detail, resin-based layer 18 includes a synthetic resin, a cell-forming agent, and a filler. A synthetic resin comprises from about 35.0 percent to about 95.0 percent by weight, preferably from about 75.0 percent to about 94.0 percent by weight, and most preferably from about 78.0 percent to about 90.0 percent by weight of layer 18. As used herein, the term "cell-forming agent" refers generally to agents which produce bubbles, pores, or cavities in layer 18. That is, resin-based layer 18 has a cellular structure, having numerous cells disposed throughout its mass. This cellular structure provides a low-density, high-strength material, which, in beam 12, provides a strong, yet lightweight structure. Cell-forming agents which are compatible with the present invention include reinforcing "hollow" microspheres or microbubbles which may be formed of either glass or plastic. Plastic microspheres may be either thermosetting or thermoplastic and either expanded or unexpanded. In one embodiment, unexpanded microspheres are used which are then expanded to form resin-based layer 18. The preferred microspheres are from about 1.0 to about 250 and preferably from about 10 to about 180 microns in diameter. The cell-forming agent may also comprise a larger, lightweight material such as macrospheres of greater than 400 microns in diameter. Also, the cell-forming agent may comprise a blowing agent which may be either a chemical blowing agent or a physical blowing agent. Glass microspheres are particularly preferred. Where the cell-forming agent comprises microspheres or macrospheres, it constitutes from about 1.0 percent to about 60.0 percent by weight, preferably from about 1.0 percent to about 35.0 percent by weight, and most preferably from about 3.0 percent to about 20.0 percent by weight of layer 18. Where the cell-forming agent comprises a blowing agent, it constitutes from about 1.0 percent to about 10.0 percent by weight, preferably from about 1.0 percent to about 5.0 percent by weight, and most preferably from about 3.0 percent to about 5.0 percent by weight of layer 18. Suitable fillers include glass or plastic microspheres, silica fume, calcium carbonate, milled glass fiber, and chopped glass strand. Glass microspheres are particularly preferred. Other materials may be suitable. A filler comprises from about 1.0 percent to about 55.0 percent by weight, preferably from about 5.0 percent to about 24.0 percent by weight and most preferably from about 7.0 percent to about 19.0 percent by weight of resin-based layer 18.

Preferred synthetic resins for use in the present invention include thermosets such as epoxy resins, vinyl ester resins, thermoset polyester resins, and urethane resins. It is not intended that the scope of the present invention be limited by molecular weight of the resin. Where the resin component of the liquid filler material is a thermoset resin, various accelerators, such as "EMI-24" (imidazole accelerator) and "DMP-30," and curing agents, preferably organic peroxides such as "MEK" peroxide and "Percadox," may also be included to enhance the cure rate. A functional amount of accelerator is typically from about 0.1 percent to about 4.0 percent of the resin weight with corresponding reduction in one of the three components, resin, cell-forming agent or filler. Similarly, the amount of curing agent used is typically from about 12 percent to about 4 percent of the resin weight with a corresponding reduction in one of the three components, resin, cell-forming agent or filler. Effective amounts of processing aids, stabilizers, colorants, UV absorbers and the like may also be included in layer. Thermoplastics may also be suitable.

In the following tables, preferred formulations for resin-based layer 18 are set forth. It has been found that these formulations provide a layer 18 which results in a beam 12 having a stiffness-to-mass ratio of greater than 1, where 1 is a normalized stiffness-to-mass ratio of a hollow or open C-channel metal beam regardless of mass.

Formulas I and III are preferred for use with clean metal surfaces (i.e., after removing any residue on the contacting metal surfaces such as mill oils and drying compounds). Formula II does not require extensive pre-cleaning of the metal.

| INGREDIENT | PERCENTAGE BY WEIGHT |
| --- | --- |
| FORMULA I | |
| Polyester Resin ("ARS-137-69") | 80.9 |
| "Percadox 16N" | 1.1 |
| "3M C15" | 18 |
| FORMULA II | |
| EPON 828 | 54.5 |
| Haloxy 62 | 7.5 |
| Der 732 | 6.1 |
| Expancel 551DU | 2.0 |
| SG Micros | 8.8 |
| 3M K20 | 17.7 |
| DI-CY | 3.4 |
| FORMULA III | |
| Polyester Resin ("ARISTECH 13031") | 48.8 |
| "Percadox 16N" | 0.7 |
| "SG Micros" (PA IND) | 50.5 |

As will be appreciated by those skilled in the art, EPON 828 is an epoxy resin, Haloxy 62 is an epoxy diluent, Der 732 is a flexible epoxy, Expancel 551 DU is a blowing agent, SG Micron and 3M K20 are microspheres and DI-CY is a curing agent.

A number of methods of applying layer 18 to reinforcement tube 16 may be suitable, for example by spraying the resin-based material onto the surface of tube 16. It may be suitable to fill the space between the inner and outer tubes after they are assembled. Most preferred is the application of the resin-based material using a duck-bill applicator which applies a wide, even ribbon of resin on the surfaces of tube 16. In most applications, the thickness (inches) of layer 18 should be from about 0.060 to about 0.50 and more preferably from about 0.10 to about 0.25, where the preferred foam compositions described herein are utilized.

In those embodiments of the present invention in which outer shell 14 has one or more through-holes 26, for example, for the passage of electrical wiring or the like, it will be necessary to provide matching through-holes 32 in inner tube 16 in register with the through-holes 26 of the outer shell. Since structural foam layer 18 could in some instances block all or a portion of through-holes 32, requiring a separate assembly step of clearing the foam material from the hole, In a preferred embodiment of this invention, clearance is obtained by creating over-sized through-holes 32 in alignment with through-holes 26. It is preferred that the diameter of through-holes 32 be at least 20 percent larger than that of through-holes 26, but in some applications equal size through-holes will be sufficient. In this manner, resin or foam which extends from the edges of inner tube 16 into the clearance of through-holes 32 will generally not block wire, clips or screws and the like that are threaded through through-holes 26. This concept is also illustrated in FIG. 2A (as viewed looking through hole 32 from the inside) in which a portion of layer 18 extends into the clearance of through-hole 32 during application, but not to the margins of through-hole 26. In the event that layer 18 does obstruct any of the through-holes 32, it may be blown clear using an air jet before layer 18 solidifies.

Referring again to FIGS. 2 and 5, cap 20 closes radiator support beam 12 as well as cavity or channel 34 defined by inner tube 16. Cavity 34 will generally be clear (i.e., inner tube 16 will be hollow) other than for the presence of wiring. Cap 20 is preferably welded in place. The effective thickness of the reinforced walls of beam 12 is typically four to five times that of shell 14, with very little increase in weight.

Where layer 18 is a thermoset and/or expandable resin-based material, layer 18 may be cured and/or expanded in place from the heat of the B-coat oven. It is preferred that layer 18 bond together shell 14 and tube 16. It should also be noted that the construction of the present invention allows the B-coat to drain, which would not be possible if the entire beam were foam-filled. In addition, the minimal amount of foam which is used does not create a heat sink body as is the case with large, dense foam areas and the minimal amount of foam usage reduces materials cost. Also, the need for plugs or the like to allow foam filling of the entire beam is eliminated.

In another embodiment of the present invention, and referring now to FIGS. 7, 8, and 9, inner tube 16' is shown which has a rectangular shape and is in the nature of a closed rectangular tube (i.e. closed along its length). As with channel-shaped inner tube 16 rectangular inner tube 16' will generally be hollow. Layer 18 is shown applied to three sides of inner tube 16'. In general, at least about 25 percent and more preferably at least about 75 percent of the mating area which forms the tube-in-tube region of beam 12 should be covered by layer 18.

Where desired, inner tube 16 at through-holes 32 may be flanged inwardly toward outer shell 14 such that the flange serves as a closure to confine and isolate layer 18. Alternatively, outer shell 14 at through-holes 26 may be flanged inwardly toward inner tube 16 for the same purpose. Also, plugs or grommets in through-holes 26 and/or 32 can be used for this purpose.

A number of materials can be used to form outer shell 14 and inner tube 16 such as plastic or metal, but steel is preferred. The outer shell metal gauge (inches) will typically be from about 0.030 to about 0.090. The inner tube metal gauge will typically be from about 0.025 to about 0.050.

A number of additional specific applications of the present invention will be apparent in light of the teachings herein. A few of the preferred applications are set forth hereinafter.

Figure 10:
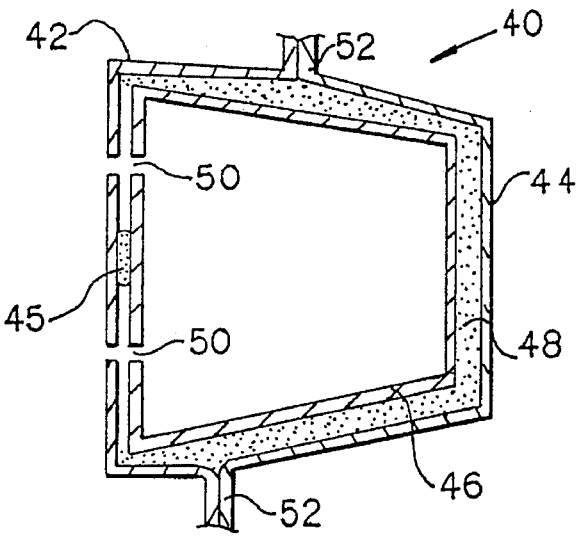
FIG. 10 is a cross-section of a rocker panel made in accordance with the present invention.

Referring now to FIG. 10 of the drawings, metal automotive rocker panel assembly 40 is shown having metal rocker inner panel 42 and metal rocker outer panel 44. Inner tube 46 is provided along with a layer of resin-based material 48 disposed thereon which separates inner tube 46 from the rocker panels 42 and 44. An adhesive bead 45, which may be made of the same material as layer 48, is provided adjacent trim holes 50. The assembly is welded at flanges 52.

Figure 11:
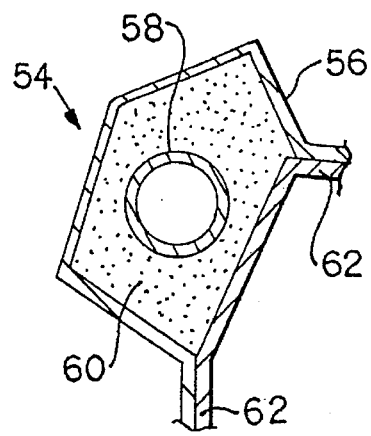
FIG. 11 is a cross-section of a windshield pillar made in accordance with the present invention.

In FIG. 11, the present invention is shown in use as a windshield pillar 54. Again, the tube-in-tube construction is employed with windshield pillar outer 56 being separated from windshield pillar inner tube 58 by resin-based layer 60. The assembly is welded together at flanges 62.

Figure 12:
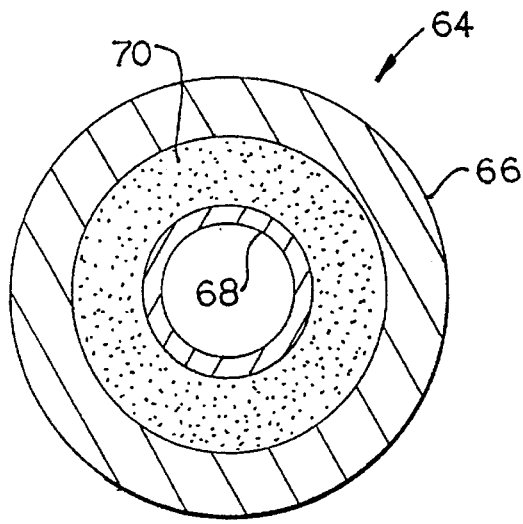
FIG. 12 is a cross-section of a drive shaft made in accordance with the present invention.

In FIG. 12, a cross-section of automotive driveshaft 64 is shown having an outer metal tube 66 separated from an inner metal tube 68 by a layer of structural foam 70.

Figure 13:
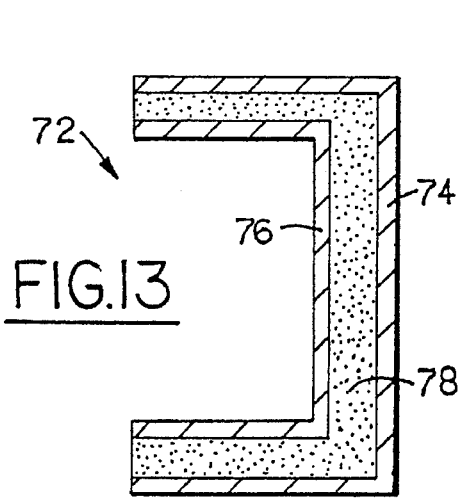
FIG. 13 is a cross-section of a C-rail section made in accordance with the present invention.

In FIG. 13, C-rail 72 is shown having outer wall section 74 separated from inner tube or channel portion 76 by a layer of structural foam 78.

Figure 14:
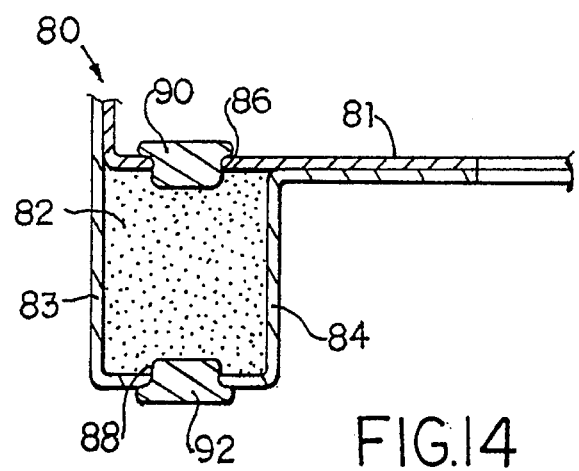
FIG. 14 is a cross-section of a radiator support beam made according to another aspect of the present invention.

In still another embodiment, and referring now to FIG. 14 of the drawings, the entire cavity of a structural member such as radiator support beam 80 having cap 81 and shell 83 is filled with a cementatious material or a structural foam 82. In order to prevent material 82 from flowing out of cavity 84 through through-holes 86 and 88, plugs 90 and 92 are provided, preferably formed of a foam material such as Styrofoam™ which will disintegrate at temperatures present in automotive treatment ovens. The plugs are preferably inserted into all through-holes except those through which material 82 is injected. In this manner, plugs 88 and 90 are automatically "removed" so that sufficient clearance is maintained for wiring clips and the like. The preferred material for use in forming material 82 is described in U.S. Pat. No. 5,124,186, "Composite Tubular Door Beam Reinforced with a Reacted Core Localized at the Mid-Span of the Tube," dated Jun. 23, 1992, the entire disclosure of which is incorporated by reference. Most preferably, the material described beginning at line 41 of column 10 of the aforementioned U.S. Pat. No. 5,124,186 is preferred.

What is claimed is:

1. A laminate radiator support beam, comprising:

a longitudinal outer structural metal portion defining a channel and having an outer wall surface and an inner wall surface;

a longitudinal metal inner tube portion disposed in said channel having an outer wall surface and an inner wall surface, said inner wall surface of said inner tube portion defining a longitudinal hollow cavity, wherein said outer wall surface of said longitudinal inner tube portion defines at least three walls;

a layer of structural foam disposed between and bonded to said inner wall surface of said outer structural portion and said outer wall surface of said inner tube portion along substantially the entire length of said inner tube portion, said structural foam layer being bonded to three of said at least three walls of said inner tube portion outer wall surface;

a cap attached to said outer structural metal portion closing said channel; and attachment sites on said laminate radiator support beam for connecting a radiator to said support beam.

2. The invention recited in claim 1, wherein said inner tube portion is open along at least one side substantially the entire length of the tube.

3. The invention recited in claim 1, wherein said inner tube portion has at least one through-hole, said outer structural portion has at least one through-hole in register with said through-hole of said inner tube portion, said through-hole of said inner tube portion having a larger diameter than said through hole of said outer structural portion.

4. The invention recited in claim 1, wherein said outer structural portion and said inner tube portion have substantially the same shape.

5. A method of reducing vibration and increasing the stiffness-to-mass ratio of a longitudinal metal automotive beam having an inner wall which defines a cavity, said inner wall having a through-hole extending therethrough, comprising the steps of:

forming a longitudinal metal tube which fits within the cavity defined by said inner wall of said beam, said tube having a wall and said wall having at least one through-hole extending therethrough;

placing a layer of thermally-expandable resin on the outer surface of said tube along the length of said tube;

inserting said tube in said cavity such that said thermally-expandable resin is in contact with said inner wall of said beam and such that said tube is substantially entirely enclosed within said beam, wherein said through-hole of said beam is in register with said through-hole of said wall of said tube;

heating said beam and said thermally-expandable resin to form a thermally-expanded structural foam and to bond said structural foam to said inner wall of said beam;

wherein the stiffness of said beam is increased non-linearly over the increase in mass created by the addition of said tube and said structural foam to said beam.

6. The invention recited in claim 5, wherein said tube is roll-formed metal.

7. The invention recited in claim 5, wherein said tube is open along at least one side substantially the entire length of the tube.

8. The invention recited in claim 5, wherein said tube is hollow.

9. The invention recited in claim 5, wherein said beam and said tube have substantially the same shape.

10. The invention recited in claim 5, wherein said at least one through-hole of said tube is larger in diameter than said through-hole of said beam.

* * * * *